US012478989B2

(12) United States Patent
Manga et al.

(10) Patent No.: US 12,478,989 B2
(45) Date of Patent: Nov. 25, 2025

(54) SHOWERHEAD

(71) Applicant: Brasstech, Inc., Santa Ana, CA (US)

(72) Inventors: Joseph Manga, Irvine, CA (US); George Jesse Bazan, Santa Ana, CA (US)

(73) Assignee: Brasstech, Inc., Santa Ana, CA (US)

( * ) Notice: Subject to any disclaimer, the term of this patent is extended or adjusted under 35 U.S.C. 154(b) by 734 days.

(21) Appl. No.: 17/733,325

(22) Filed: Apr. 29, 2022

(65) Prior Publication Data

US 2023/0347360 A1 Nov. 2, 2023

(51) Int. Cl.
*B05B 1/18* (2006.01)
*B05B 15/528* (2018.01)

(52) U.S. Cl.
CPC ................ *B05B 1/185* (2013.01); *B05B 1/18* (2013.01); *B05B 15/528* (2018.02)

(58) Field of Classification Search
CPC .......... B05B 1/18; B05B 1/185; B05B 15/528
USPC ....... 239/533.13, 533.14, 548, 602, DIG. 12, 239/DIG. 19
See application file for complete search history.

(56) References Cited

U.S. PATENT DOCUMENTS 6,250,572 B1 * 6/2001 Chen ....................... B05B 1/185 239/533.13
6,739,527 B1 * 5/2004 Chung .................. B05B 15/528 239/533.13
6,935,581 B2 * 8/2005 Titinet .................... B05B 1/185 239/533.13
7,077,342 B2 * 7/2006 Lee ........................... B05B 1/18 239/596
7,111,798 B2 9/2006 Thomas et al.
7,959,088 B2 6/2011 Bolus et al.
10,071,386 B2 9/2018 Ukigai et al.
11,192,124 B2 12/2021 Russell et al.
2019/0247868 A1 8/2019 Huffington et al.
2020/0376505 A1 12/2020 Peterson
2021/0086205 A1 3/2021 Downey

FOREIGN PATENT DOCUMENTS

WO 2016203349 A1 12/2016
WO 2021022520 A1 2/2021

OTHER PUBLICATIONS

Newport Brass, Newport Bath Showerhead 214; retrieved on Jan. 13, 2022 from https://www.newportbrass.com/products/collections/116/Tub-Shower/26/Polished-Chrome/214, 2 pages.

* cited by examiner

*Primary Examiner* — Steven J Ganey
(74) *Attorney, Agent, or Firm* — Bose McKinney & Evans LLP

(57) ABSTRACT

A showerhead including a faceplate with openings supporting outer nozzles. The outer nozzles cooperate with a membrane having inner nozzle protrusions. A backer support secures the membrane in place relative to the outer nozzles and creates water flowpaths to the inner nozzle protrusions.

18 Claims, 9 Drawing Sheets

SHOWERHEAD

BACKGROUND AND SUMMARY OF THE DISCLOSURE

The present disclosure generally relates to a showerhead and, more particularly, to a showerhead including outer nozzles cooperating with a flexible membrane defining inner nozzle protrusions.

Showerheads are known to dispense water through outlets, such as nozzles, in order to generate a spray of water within a bathing area. In conventional designs, such showerhead nozzles may be made of brass which may become clogged from debris and/or mineral deposit build up from water flowing through the showerhead. Additionally, many conventional showerhead designs allow water to fill the relatively large interior volume of the showerhead defined by an outer shell. Due to this, the water pressure discharged from the showerhead may be low and thus not meet operational guidelines, such as those provided by the United States Environmental Protection Agency (EPA) (e.g., WaterSense criteria).

As such, there remains a need for a showerhead with rigid outer (e.g., brass) nozzles that allows for improved flow of water, and reduced clogging of the nozzles from debris and/or mineral deposits.

According to an illustrative embodiment of the present disclosure, a showerhead includes a faceplate having a faceplate front surface, a faceplate rear surface, and a plurality of nozzle openings extending from the faceplate front surface to the faceplate rear surface. A shell is coupled to the faceplate, and a plurality of outer nozzles are supported within the nozzle openings of the faceplate. The plurality of outer nozzles extend outwardly relative to the faceplate front surface from an inlet to an outlet. A membrane includes a membrane front surface and a membrane rear surface. A plurality of inner nozzle protrusions extend outwardly from the membrane front surface, and each inner nozzle protrusion includes a nozzle tip. Each inner nozzle protrusion includes an inlet opening defined proximate the membrane rear surface and an outlet defined proximate the nozzle tip. A water passage extends from the inlet opening to the outlet opening of each inner nozzle protrusion. The plurality of inner nozzle protrusions are supported within the plurality of outer nozzles, and the nozzle tips protrude outwardly beyond the outlet of outer nozzles. A backer support includes a plurality of standoffs, and a plurality of passageways are defined between the standoffs. The plurality of standoffs secure the membrane between the outer nozzles and the backer support.

According to another illustrative embodiment of the present disclosure, a showerhead includes a faceplate having a faceplate front surface, a faceplate rear surface, and a plurality of nozzle openings extending from the faceplate front surface to the faceplate rear surface. A shell is coupled to the faceplate, and a plurality of outer nozzles are supported within the nozzle openings of the faceplate. The plurality of outer nozzles extend outwardly relative to the faceplate front surface from an inlet to an outlet. A membrane includes a membrane front surface and a membrane rear surface. A plurality of inner nozzle protrusions extend outwardly from the membrane front surface, and each inner nozzle protrusion includes a nozzle tip. Each inner nozzle protrusion includes an inlet opening defined proximate the membrane rear surface and an outlet opening defined proximate the nozzle tip. A water passage extends from the inlet opening to the outlet opening of each inner nozzle protrusion. The plurality of inner nozzle protrusions are supported within the plurality of outer nozzles. A waterway extends within the shell between an inlet and an outlet. A backer support is operably coupled to the shell. The waterway cooperates with the backer support to provide a clamping force against the membrane. The backer support and the membrane define a chamber for water flow from the outlet of the waterway through the inner nozzle protrusions.

According to a further illustrative embodiment of the present disclosure, a showerhead includes a faceplate having a faceplate front surface, a faceplate rear surface, and a plurality of nozzle openings extending from the faceplate front surface to the faceplate rear surface. A shell is coupled to the faceplate. A plurality of outer nozzles are formed of a rigid material and supported within the nozzle openings of the faceplate. The plurality of outer nozzles extend outwardly relative to the faceplate front surface from an inlet to an outlet. A membrane is formed of a flexible material and includes a membrane front surface and a membrane rear surface. A plurality of inner nozzle protrusions extend outwardly from the membrane front surface, and each inner nozzle protrusion includes a nozzle tip. Each inner nozzle protrusion includes an inlet opening defined proximate the membrane rear surface and an outlet opening defined proximate the nozzle tip. A water passage extends from the inlet opening to the outlet opening of each inner nozzle protrusion. The plurality of inner nozzle protrusions are supported within the plurality of outer nozzles, and the nozzle tips protrude outwardly beyond the outlet of the outer nozzles. A backer support includes a plurality of standoffs, and a plurality of water passageways are defined between the standoffs. The water passageways are in fluid communication with the water passages of the inner nozzle protrusions. The plurality of standoffs secure the membrane between the outer nozzles and the backer support. A waterway extends within the shell between an inlet and an outlet. The waterway cooperates with the backer support to provide a clamping force against the membrane. The backer support and the membrane define a chamber for water flow from the outlet of the waterway through the inner nozzle protrusions.

BRIEF DESCRIPTION OF THE DRAWINGS

The foregoing aspects and many of the intended advantages of this invention will become more readily appreciated as the same becomes better understood by reference to the following detailed description of exemplary embodiments when taken in conjunction with the accompanying drawings, wherein.

DETAILED DESCRIPTION OF THE DRAWINGS

Figure 1:
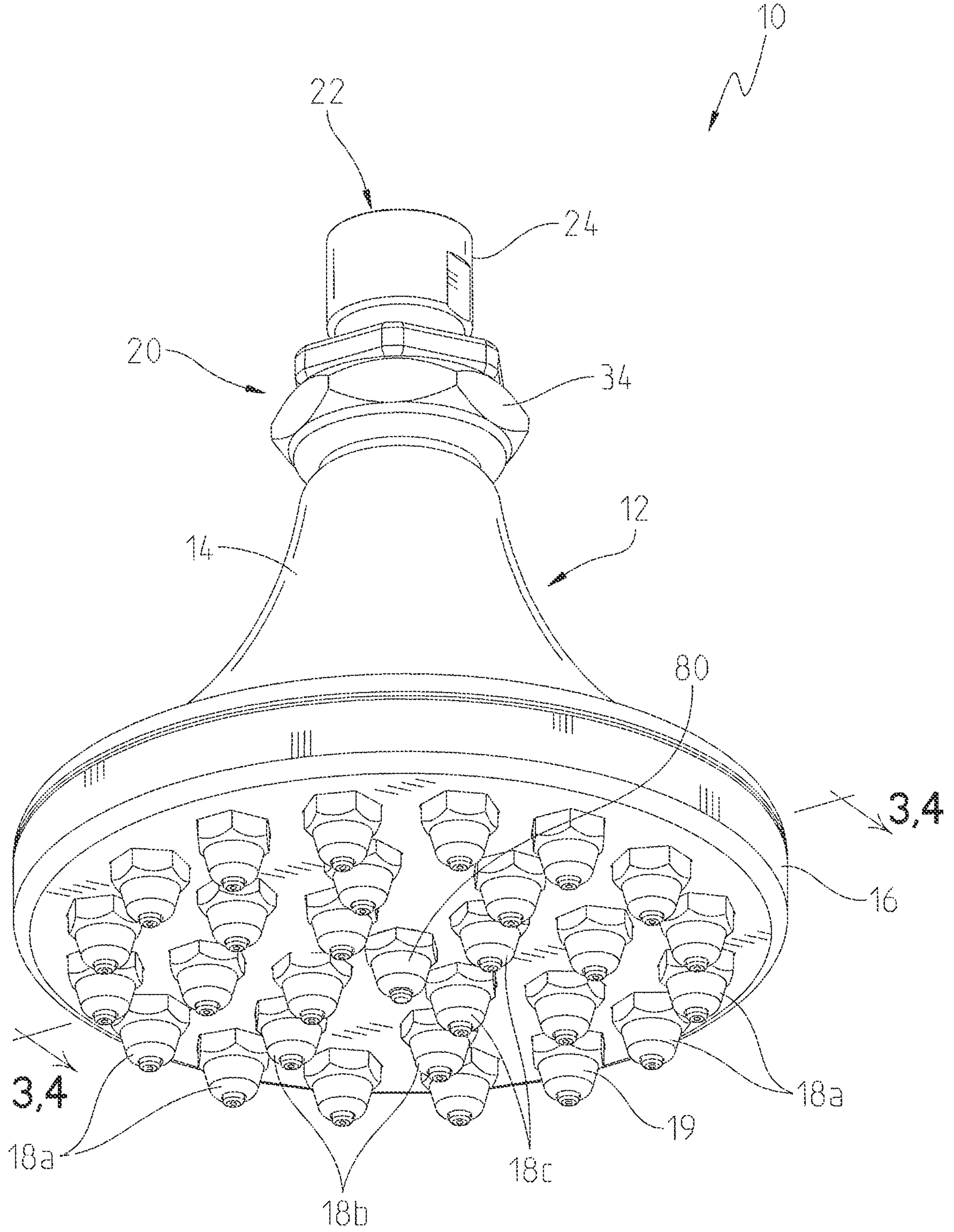
FIG. 1 is perspective view of an illustrative showerhead in accordance with the present disclosure.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Figure 2:
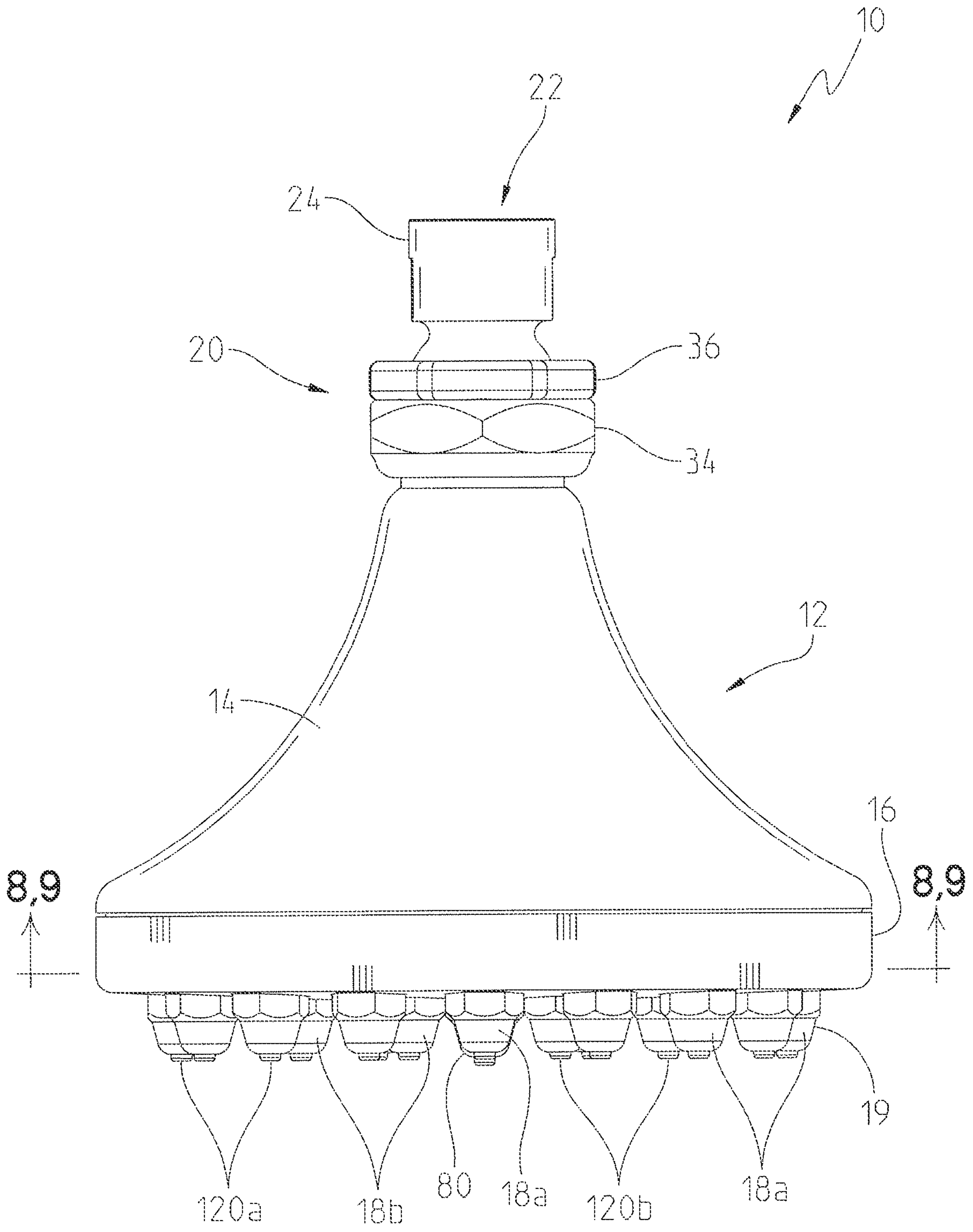
FIG. 2 is a side elevational view of the illustrative showerhead of FIG. 1.
Figure 3:
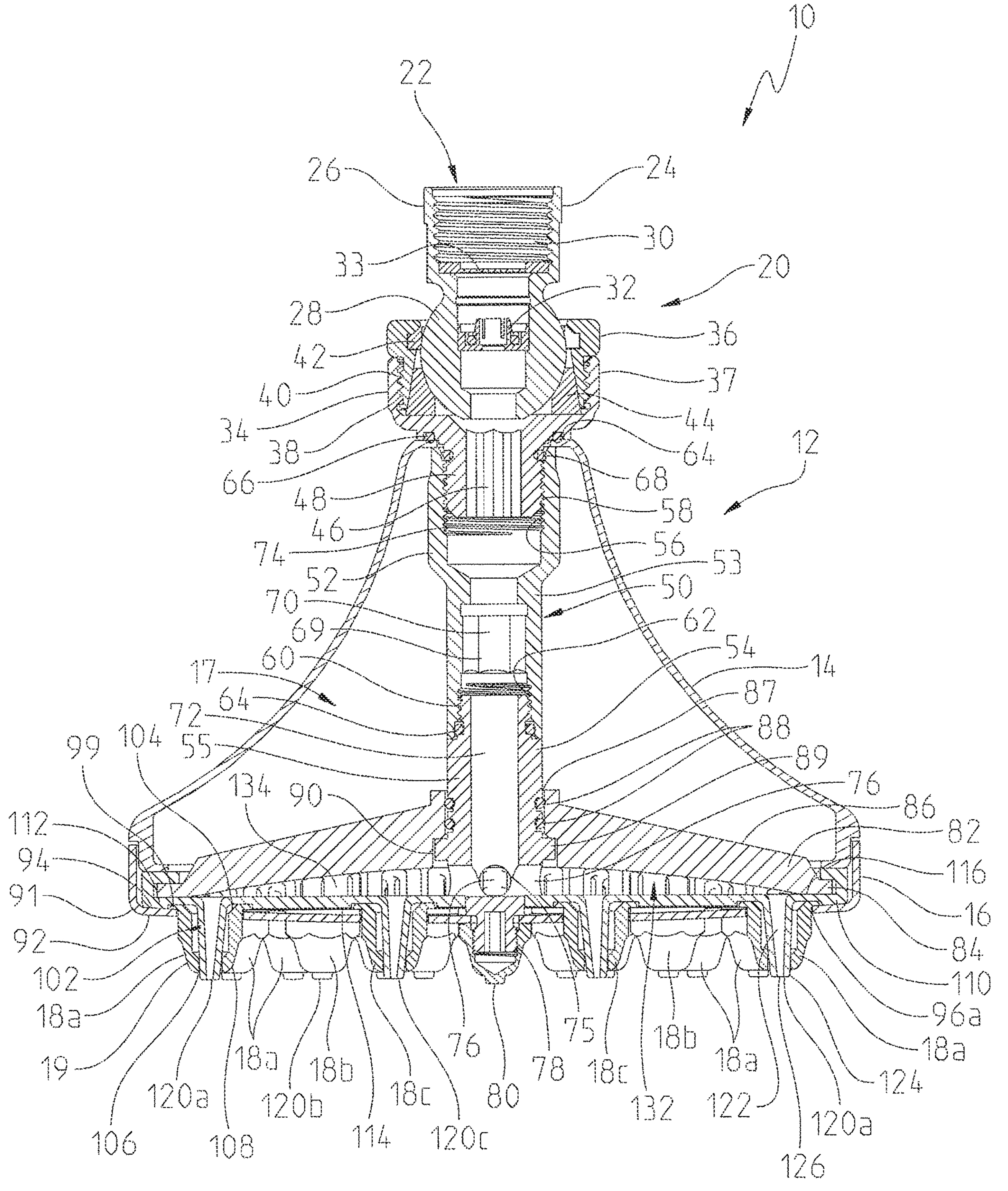
FIG. 3 is a cross-sectional view of the illustrative showerhead taken along line 3-3 of FIG. 1.

With reference initially to FIGS. 1 and 2, an illustrative showerhead 10 includes a housing 12 defined by a shell 14 supporting a faceplate 16. The housing 12 illustratively defines an upper chamber 17 (FIG. 3). A plurality of outer nozzles 18 are supported by the faceplate 12. The outer nozzles 18 illustratively include a body 19 formed of a rigid material, such as a metal. In one illustrative embodiment, the body 19 of the outer nozzles 18 are formed of brass. The outer nozzles 18 are illustratively arranged in a plurality of concentric rings, including a ring of outer nozzles 18*a*, a ring of intermediate nozzles 18*b*, and a ring of inner nozzles 18*c*. In one illustrative embodiment, there are sixteen outer nozzles 18*a*, eight intermediate nozzles 18*b*, and four inner nozzles 18*c*. It should be appreciated that the arrangement and the number of nozzles 18 may vary.

A fluid coupler 20 is supported by the shell 14 and defines an inlet 22 configured to be fluidly coupled to a pressurized water source (not shown), such as a shower pipe or arm supported within a wall. With reference to FIGS. 3-6, the fluid coupler 20 illustratively includes a ball connector 24 including a threaded inlet 26 and a ball 28 defining a water passageway 30. A conventional flow restrictor 32 may be secured within the water passageway 30. The ball connector 24 may be rotatably supported by a receiver 34. More particularly, the ball 28 is received intermediate an upper portion 37 of the receiver 34 and a bonnet nut 36. An upper seal or gasket 42 and a lower seal or gasket 44 cooperate with the ball 28. More particularly, the gaskets 42 and 44 provide sliding fluid seals with the ball 28. A water passageway 46 is defined by a lower portion 48 of the receiver 34 and is fluidly coupled with the water passageway 30 of the ball connector 24.

The receiver 34 includes internal threads 38 that threadably couple with external threads 40 of the bonnet nut 36. More particularly, the ball connector 24 is axially secured through engagement of the internal threads 38 of the receiver 34 and the external threads 40 of the bonnet nut 36. The ball connector 24 of the fluid coupler 20 permits rotational movement of the showerhead 10 about orthogonal axes while maintaining fluid communication between the water passageways 30 and 46 of the ball connector 24 and the receiver 34, respectively.

With further reference to FIGS. 3-6, a waterway 50 is fluidly coupled to the fluid coupler 20 to allow water to flow from a water source through the fluid coupler 20 and out of the showerhead 10. The waterway 50 illustratively includes an upper member 52 defined by a tubular body 53, and a lower member 54 defined by a tubular body 55. Illustratively, the upper member 52 of the waterway 50 includes internal threads 56 that mate with external threads 58 of the lower portion 48 of the receiver 34 to operably couple together the ball connector 20 and the waterway 50. The lower member 54 of the waterway 50 illustratively includes external threads 60 that mate with internal threads 62 of the upper member 52 of the waterway 50 to operably couple the lower portion 54 and the upper member 52. Engagement of the threads 60 and 62 allow for the axial position of the lower member 54 to be adjusted relative to the upper member 52. In other words, relative rotation of the upper member 52 and the lower member 54 causes axial adjustment therebetween, and resulting adjustment of the length of the waterway 50, as a result of engagement between the threads 60 and 62.

An o-ring 64 is illustratively positioned intermediate the upper member 52 and the lower member 54 to provide a fluid seal therebetween. An o-ring 66 provides a fluid seal between the shell 14 and the receiver 34, while an o-ring 68 provides a fluid seal between the upper member 52 of the waterway 50 and the receiver 34. The waterway 50 defines a water passageway 69 including an upper water passageway 70 within the upper member 52 and a lower water passageway 72 within the lower member 54. The water passageway 69 extends axially between an inlet 74 and an outlet 75. The outlet 75 is illustratively defined by a plurality of radially extending ports 76. The lower member 54 also includes lower threads 78 that engage with a center nut 80 to operably couple the faceplate 16 to the waterway 50.

Figure 4:
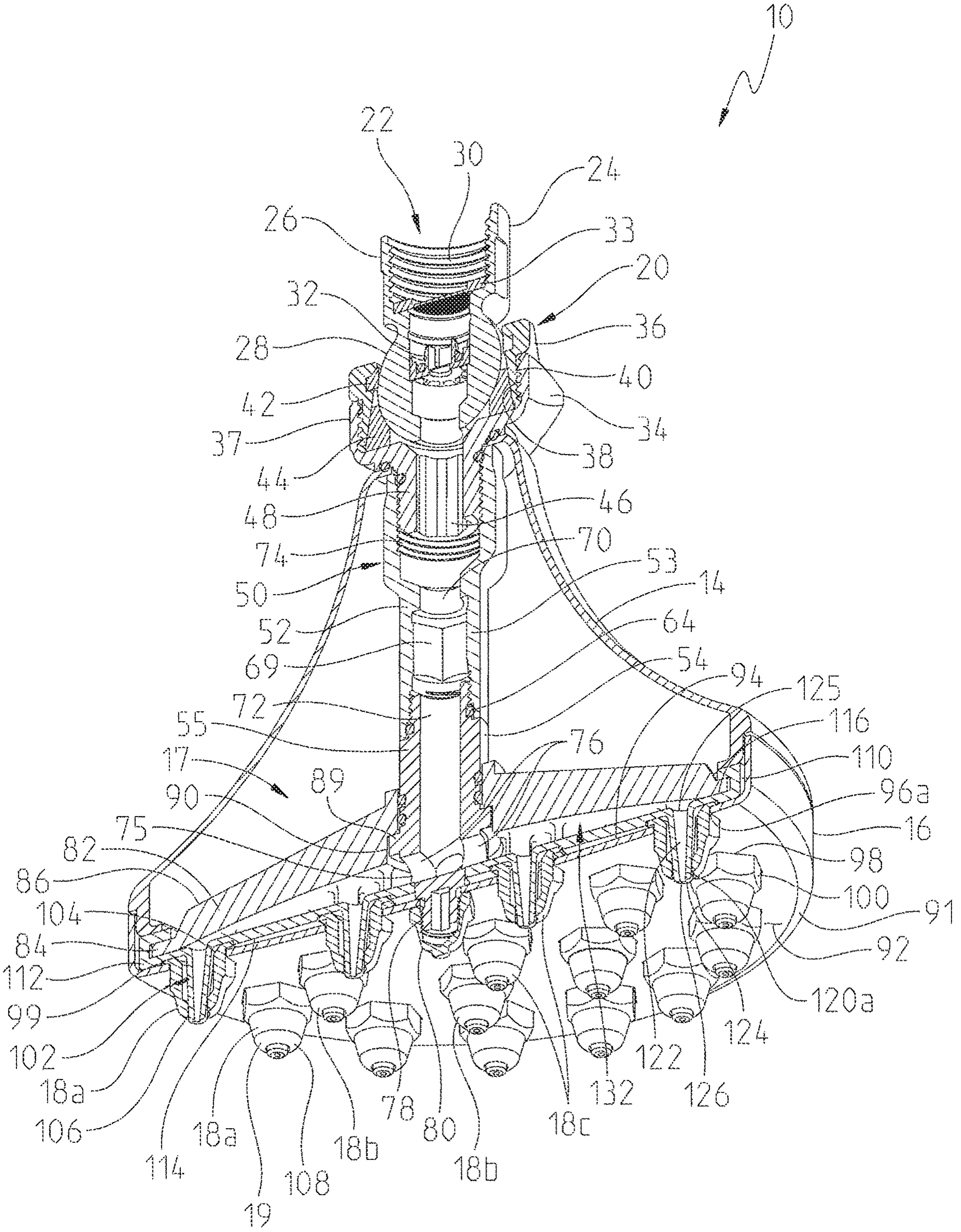
FIG. 4 is a perspective view of the illustrative showerhead, with a cross-section taken along line 4-4 of FIG. 1.
Figure 5:
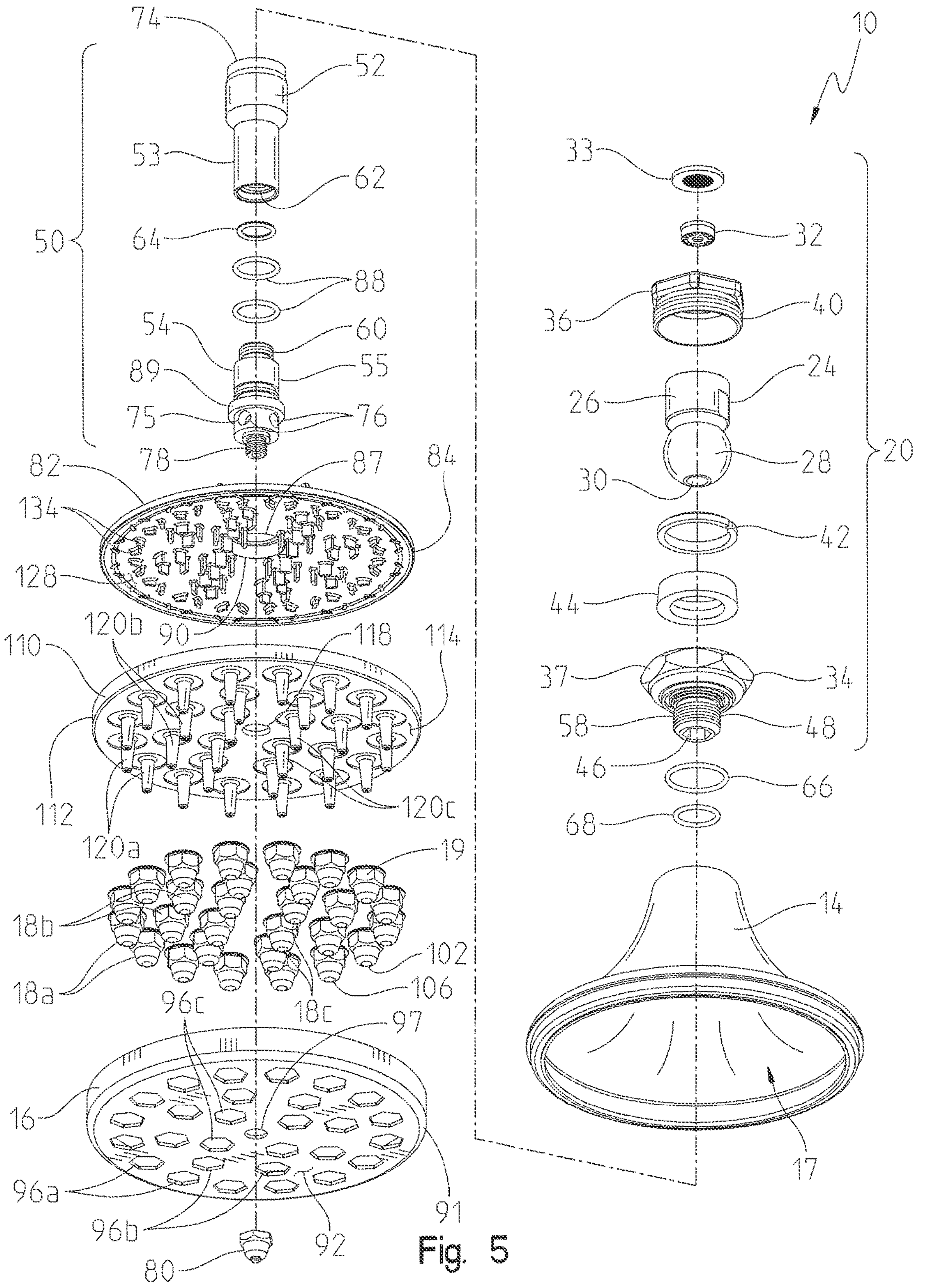
FIG. 5 is a lower exploded perspective view of the illustrative showerhead of FIG. 1.
Figure 6:
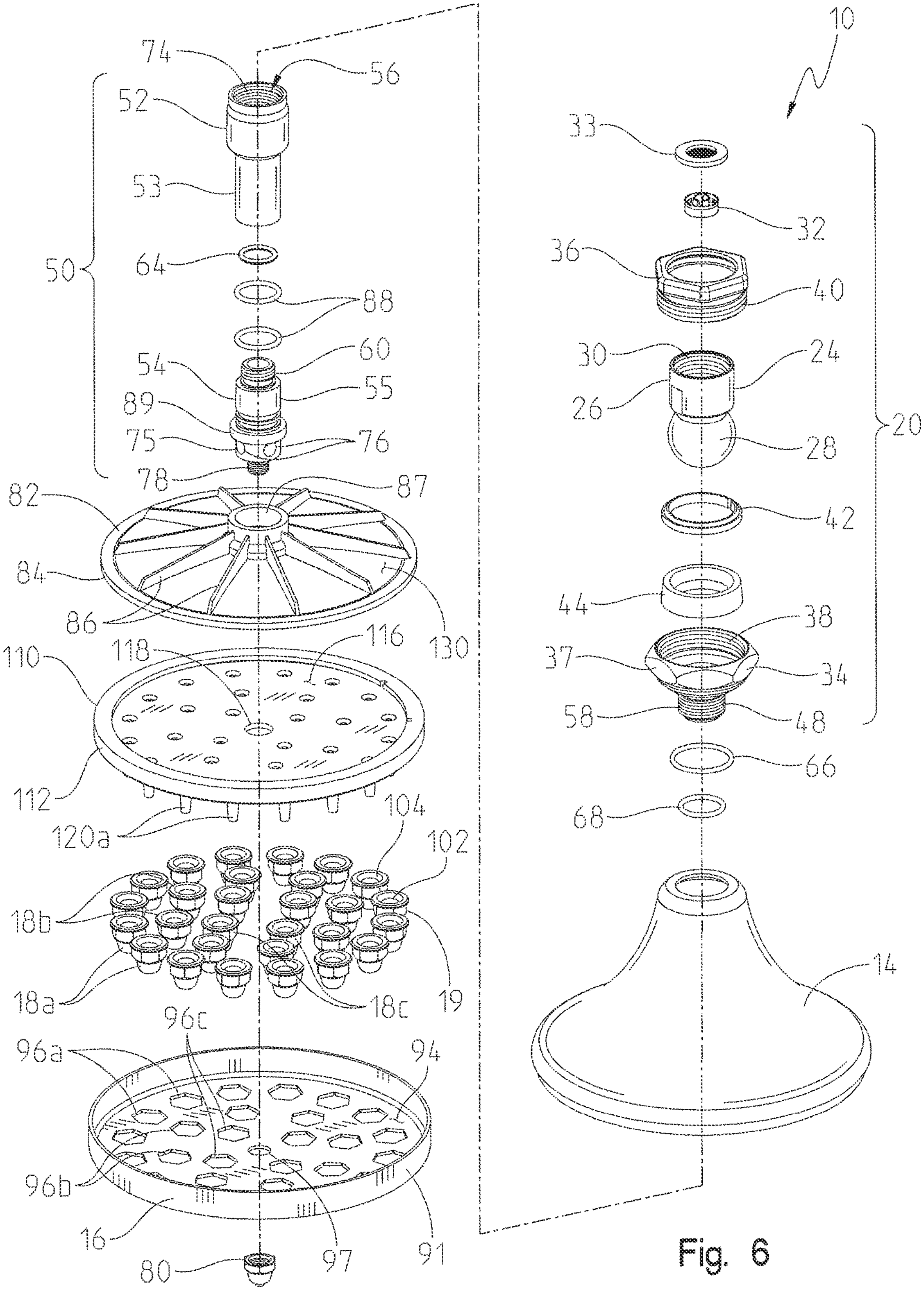
FIG. 6 is an upper exploded perspective view of the illustrative showerhead of FIG. 1.

With reference to FIGS. 3-6, a backer support 82 is operably coupled to the shell 14. The backer support 82 illustratively includes a lower plate 84 and a plurality of upper radially extending strengthening ribs or webs 86 (FIG. 6). A center opening 87 of the backer support 82 illustratively receives a lower end of the waterway 50. O-rings 88 are illustratively received within the center opening 87 to fluidly seal the backer support 82 with the lower member 54 of the waterway 50. The lower member 54 of the waterway 50 includes an annular protrusion or ring 89 secured within a recess 90 of the backer support 82 wherein axial adjustment of the outlet 75 of waterway 50 relative to the inlet 74 of the waterway 50 causes axial adjustment of the backer support 82.

Figure 7:
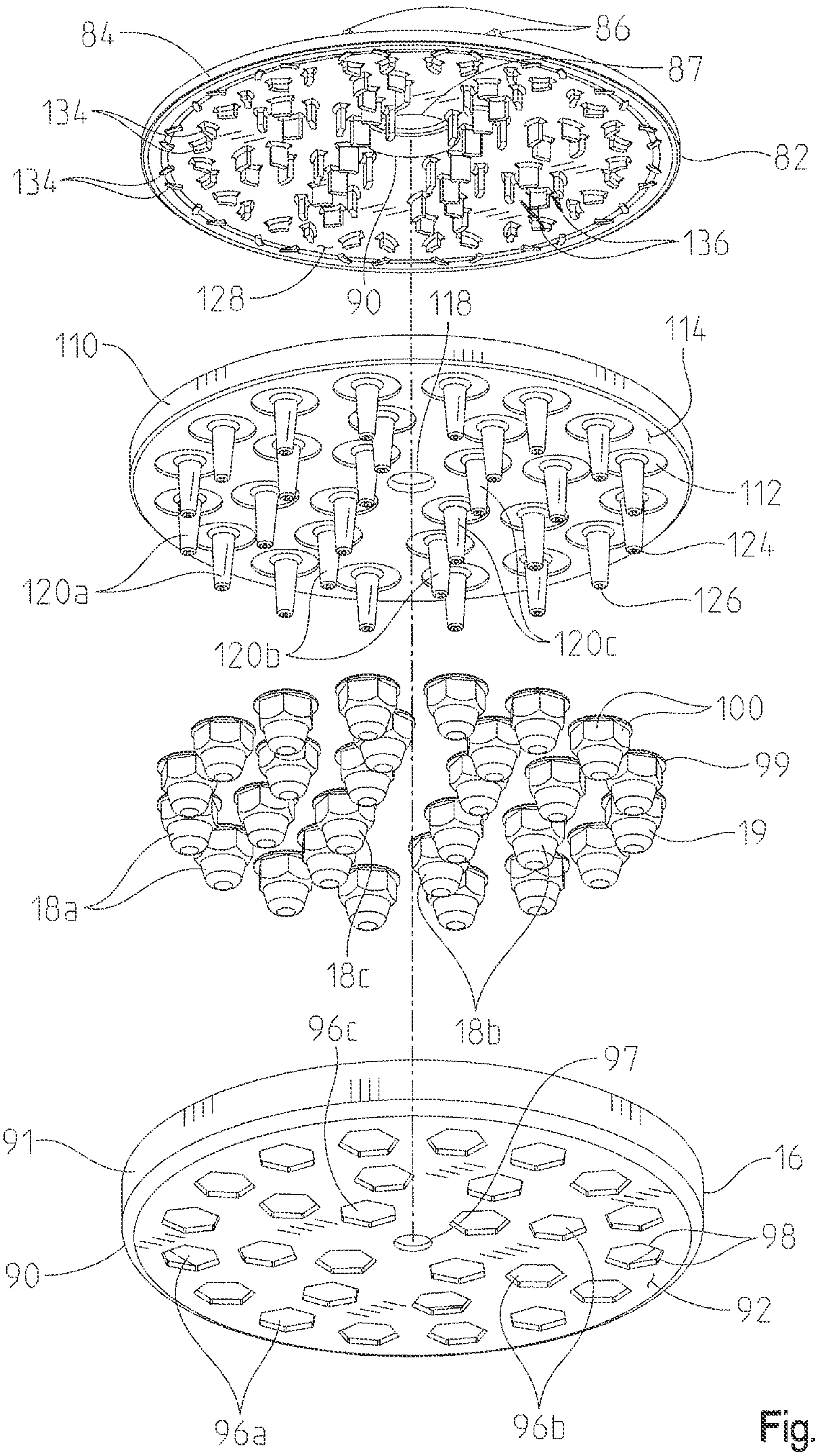
FIG. 7 is a partial exploded perspective view of the illustrative showerhead of FIG. 1.

The faceplate 16 illustratively includes a body 91 including a faceplate front surface 92 and a faceplate rear surface 94. A plurality of nozzle openings 96 and a center mounting opening 97 extend through the body 91 from the faceplate front surface 92 to the faceplate rear surface 94. As shown in FIGS. 5-7, the nozzle openings 96 are illustratively arranged in concentric rings, including an outer ring of openings 96*a*, a middle ring of openings 96*b*, and an inner ring of openings 96*c*. The outer nozzles 18 are coupled to the faceplate 16 by placing the bodies 19 of the nozzles 18 into the nozzle openings 96. Illustratively, the outer nozzles 18*a*, 18*b* and 18*c* are concentrically received within the nozzle openings 96*a*, 96*b* and 96*c*, respectively. The body 19 of each nozzle 18 illustratively includes a rear annular flange 99 that is supported by, and illustratively engages, the faceplate rear surface 94.

Illustratively, the nozzle openings 96 are shown as a hexagonal shape, but could be any shape that cooperates with the bodies 19 of the nozzles 18. With reference to FIG. 7, the openings 96 illustratively include planar edges or flats 98 which prevent rotation of the nozzles 18 when assembled into the faceplate 16. More particularly, the body 19 of each outer nozzle 18 includes planar surfaces 100 that cooperate with the planar edges 98 of the nozzle openings 96 to rotationally secure the outer nozzles 18.

With further reference to FIGS. 3 and 4, each of the outer nozzles 18 includes a passageway 102 extending within the body 19 from an inlet 104 to an outlet 106 on a bottom surface 108. The outer nozzles 18 extend outwardly (e.g., down and away) relative to the faceplate front surface 92 from the inlet 104 to the outlet 106.

The showerhead 10 also includes a membrane 110 having a flexible body 112 with a membrane front surface 114, a membrane rear surface 116, and a center opening 118. Illustratively, the body 112 of the membrane 110 is formed of an elastomer. A plurality of inner nozzle protrusions 120 are integrally molded onto the membrane 110 and extend outwardly (e.g., down and away) from the membrane front surface 114.

With further reference to FIGS. 3 and 4, the inner nozzle protrusions 120 each illustratively include a water passage 122 extending from the rear surface 116 to a nozzle tip 124 of the inner nozzle protrusion 120. The water passage 122 of each inner nozzle protrusion 120 includes an inlet opening 125 defined proximate the membrane rear surface 116 and an outlet opening 126 defined proximate the nozzle tip 124. The water passage 122 extends from the inlet opening 125 to the outlet opening 126 of each inner nozzle protrusion 120.

According to an illustrative embodiment, the inner nozzle protrusions 120 are supported within the plurality of outer nozzles 18. More particularly, the inner nozzle protrusions 120 are inserted through the inlet 104 of the outer nozzles 18 to operably couple the membrane 110 and the outer nozzles 18. As shown in FIGS. 5-7, the inner nozzle protrusions 120 are illustratively arranged in concentric rings, including an outer ring of inner nozzle protrusions 120*a*, a middle ring of inner nozzle protrusions 120*b*, and an inner ring of inner nozzle protrusions 120*c*. The inner nozzle protrusions 120*a*, 120*b* and 120*c* are operably coupled to outer nozzles 18*a*, 18*b* and 18*c* by being received concentrically within the respective passageway 102. Illustratively, the nozzle protrusions 120 are longer than the nozzles 18, thus the tip 124 extends out of the nozzle 18 and axially beyond the outlet 106 of the outer nozzle 18. In an illustrative embodiment, flexibility of the nozzle protrusions 120 make them easy to clean. More particularly, a user may engage the exposed tip 124 of the inner nozzle protrusions 120 to remove debris and mineral deposits.

The showerhead 10 of the illustrative embodiment maintains the aesthetic design of the showerhead 10 by allowing the outer nozzles 18 to be seen protruding from the faceplate 16. However, the outer nozzles 16 do not function as the passageway for the flow of water through the showerhead 10 as in previous designs. Rather, water flows through the inner nozzle protrusions 120 which are inserted through the nozzles 18. The outer nozzles 18 are primarily for decorative purposes while the inner nozzle protrusions 120 are functional, thus facilitating the removal of debris or water mineral deposits that may accumulate.

With reference to FIGS. 5-9, the backer support 82 is configured to hold the membrane 110 in place when the showerhead 10 is assembled. Illustratively, the lower plate 84 of the backer support 82 includes a front surface 128 and a rear surface 130. A lower chamber 132 is illustratively defined between the front surface 128 of the backer support 82 and the rear surface 116 of the membrane 110 (FIGS. 3 and 4). As may be appreciated, the lower chamber 132 has a reduced volume compared to the upper chamber 17.

Figure 8:
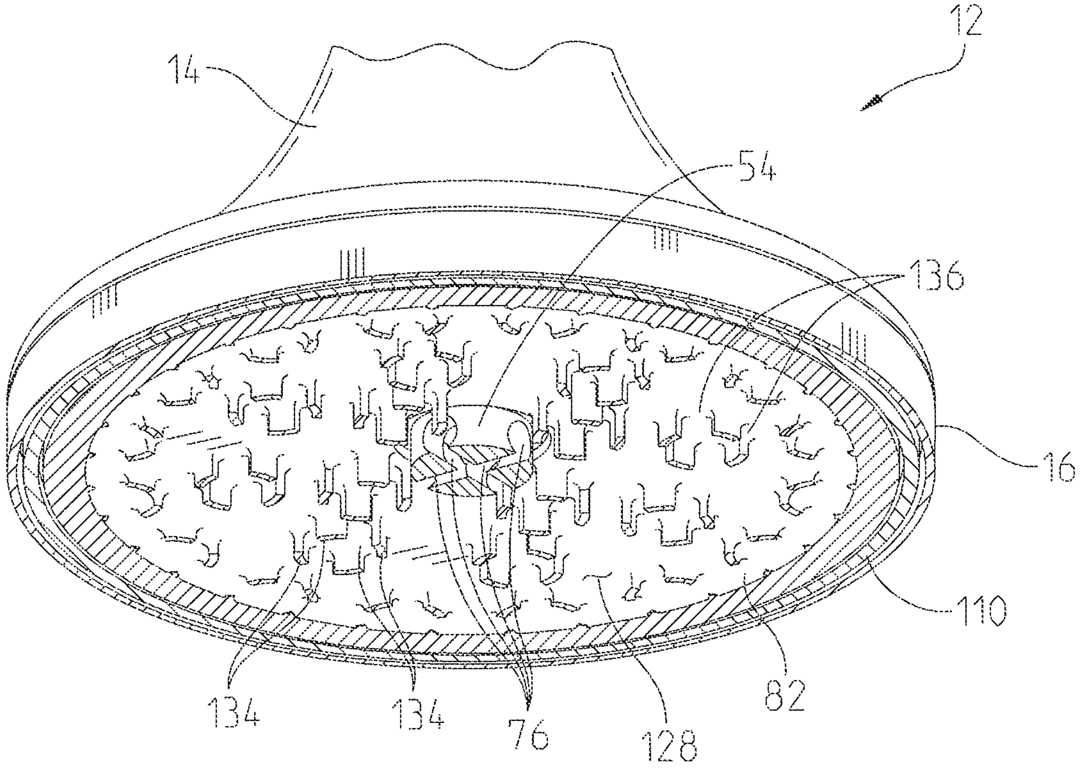
FIG. 8 is perspective view of the illustrative showerhead taken along line 8-8 of FIG. 2.
Figure 9:
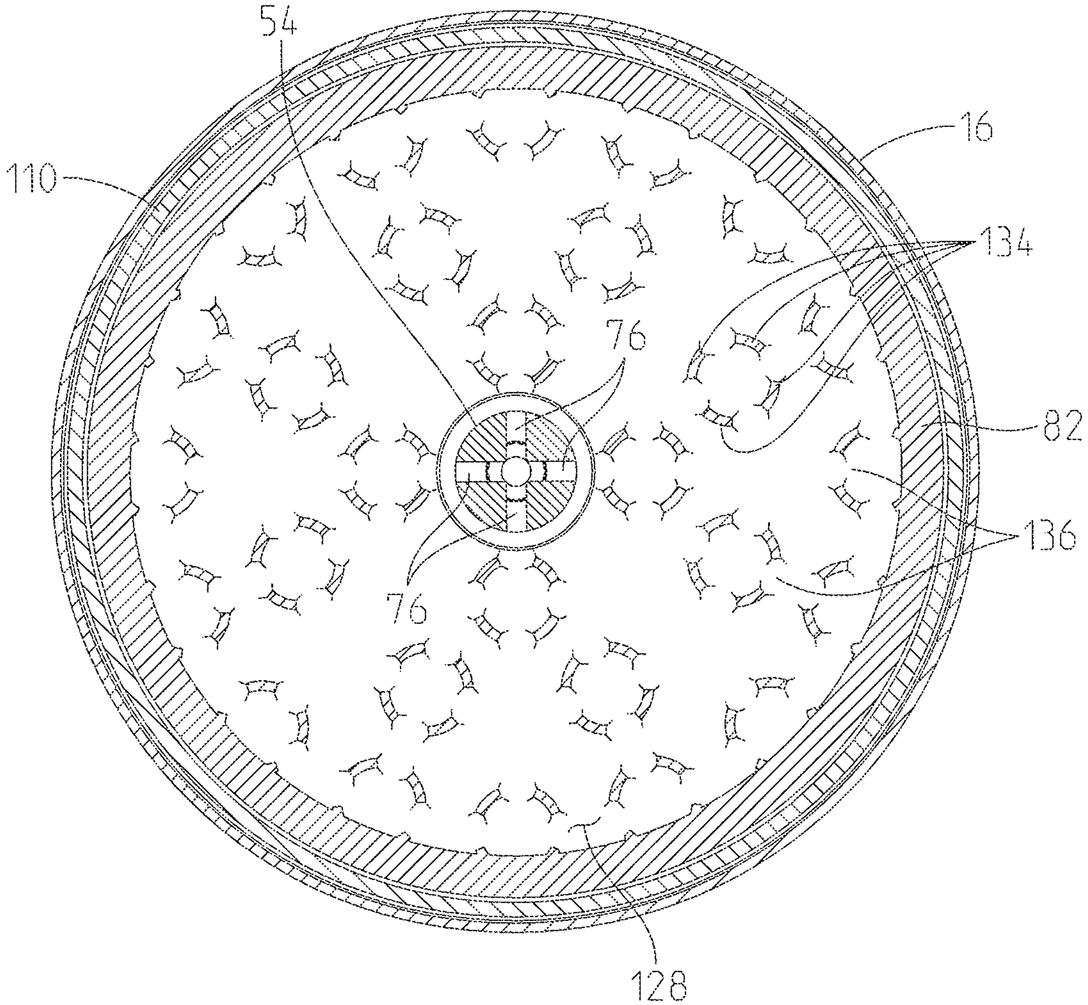
FIG. 9 is a cross-sectional view of the illustrative showerhead taken along line 9-9 of FIG. 2.

The plurality of support ribs or webs 86 are coupled to the rear surface 130 of the lower plate 84. A plurality of standoffs 134 are supported by the front surface 128 and extend outwardly (e.g., down and away) therefrom. As shown in FIGS. 8 and 9, the illustrative standoffs 134 are arcuate in nature and are grouped in circular arrangements corresponding to openings 96*a*, 96*b*, and 96*c* of the faceplate 16. Each circular group includes a plurality of water passage gaps 136 positioned between adjacent standoffs 134.

When the showerhead 10 is assembled, the standoffs 134 are compressed against the membrane 110, holding it in place to ensure the circular groups of standoffs 134 surround the inlet opening 125 of each passage 122 of the inner nozzle protrusions 120. More particularly, the membrane 110 is clamped between respective standoffs 132 and flanges 99 of the outer nozzles 18 which, in turn, are coupled to the faceplate 16.

As water flows through the showerhead 10, it enters the fluid coupler 20 and flows through the waterway 50. The water then exits the outlet 75 of the waterway and flows into the chamber 132 defined between the backer support 82 and the membrane 110. The water passes around the standoffs 132 and through the water passage gaps 106. The water then flows down through the passages 132 of each of the inner nozzle protrusions 120 to provide water to the user via the outlets 126.

By using the backer support 82, the chamber 132 through which the water flows through is much lower in volume than in previous designs. Without use of the backer support 82, the water would fill the chamber 17 created by the shell 14. In previous designs, this flow of water in the chamber 17 typically causes the pressure of the water exiting the showerhead 10 to be too low, and thus not meet recommended guidelines, such as the United States Environmental Protection Agency's WaterSense criteria. The use of the backer support 82 improves the flow of water through the showerhead 10 and does not allow as much water to fill the interior (e.g., defined by the upper chamber 17) of the showerhead 10 like previous designs.

Although the invention has been described in detail with reference to certain preferred embodiments, variations and modifications exist within the spirit and scope of the invention as described and defined in the following claims.

What is claimed is:

1. A showerhead comprising:

a faceplate including a faceplate front surface, a faceplate rear surface, and a plurality of nozzle openings extending from the faceplate front surface to the faceplate rear surface;

a shell coupled to the faceplate;

a plurality of outer nozzles supported within the nozzle openings of the faceplate, the plurality of outer nozzles extending outwardly relative to the faceplate front surface from an inlet to an outlet;

a membrane including:

a membrane front surface and a membrane rear surface, a plurality of inner nozzle protrusions extending outwardly from the membrane front surface, and each inner nozzle protrusion having a nozzle tip, and each inner nozzle protrusion including an inlet opening defined proximate the membrane rear surface and an outlet opening defined proximate the nozzle tip;

a water passage extending from the inlet opening to the outlet opening of each inner nozzle protrusion, wherein the plurality of inner nozzle protrusions are supported within the plurality of outer nozzles, and the nozzle tips protrude outwardly beyond the outlet of the outer nozzles; and a backer support including:

a plurality of standoffs, and a plurality of water passageways defined between the standoffs;

wherein the plurality of standoffs secure the membrane between the outer nozzles and the backer support.

2. The showerhead of claim 1, wherein the backer support and the membrane define a chamber for water flow through the water passages of the inner nozzle protrusions.

3. The showerhead of claim 1, wherein the nozzle openings include planar edges to cooperate with planar surfaces on the outer nozzles and prevent relative rotation of the outer nozzles.

4. The showerhead of claim 1, wherein the standoffs are oriented circumferentially around the inlet opening of the water passage for each inner nozzle protrusion thereby defining radial flow paths to the openings of the inner nozzle protrusions.

5. The showerhead of claim 1, further comprising a waterway extending within the shell between an inlet and an outlet, the outlet of the waterway in fluid communication with the water passages of the nozzle protrusions, the waterway cooperating with the backer support to provide a clamping force against the membrane.

6. The showerhead of claim 5, wherein the waterway includes an upper member and a lower member supported for axial adjustment relative to the upper member.

7. The showerhead of claim 1, wherein the outer nozzles are formed of a rigid metal, and the membrane is formed of a flexible elastomer.

8. A showerhead comprising:

a faceplate including a faceplate front surface, a faceplate rear surface, and a plurality of nozzle openings extending from the faceplate front surface to the faceplate rear surface;

a shell coupled to the faceplate;

a plurality of outer nozzles supported within the nozzle openings of the faceplate, the plurality of outer nozzles extending outwardly relative to the faceplate front surface from an inlet to an outlet;

a membrane including:

a membrane front surface and a membrane rear surface, a plurality of inner nozzle protrusions extending outwardly from the membrane front surface, and each inner nozzle protrusion having a nozzle tip, and each inner nozzle protrusion including an inlet opening defined proximate the membrane rear surface and an outlet opening defined proximate the nozzle tip;

a water passage extending from the inlet opening to the outlet opening of each inner nozzle protrusion, wherein the plurality of inner nozzle protrusions are supported within the plurality of outer nozzles;

a waterway extending within the shell between an inlet and an outlet;

a backer support operably coupled to the shell, the waterway cooperating with the backer support to provide a clamping force against the membrane;

wherein the backer support and the membrane define a chamber for water flow from the outlet of the waterway through the inner nozzle protrusions; and wherein the backer support includes a plurality of standoffs, and a plurality of water passageways between the standoffs, the water passageways in fluid communication with the water passages of the inner nozzle protrusions.

9. The showerhead of claim 8, wherein the plurality of standoffs secure the membrane between the outer nozzles and the backer support.

10. A showerhead comprising:

a faceplate including a faceplate front surface, a faceplate rear surface, and a plurality of nozzle openings extending from the faceplate front surface to the faceplate rear surface;

a shell coupled to the faceplate;

a plurality of outer nozzles supported within the nozzle openings of the faceplate, the plurality of outer nozzles extending outwardly relative to the faceplate front surface from an inlet to an outlet;

a membrane including:

a membrane front surface and a membrane rear surface, a plurality of inner nozzle protrusions extending outwardly from the membrane front surface, and each inner nozzle protrusion having a nozzle tip, and each inner nozzle protrusion including an inlet opening defined proximate the membrane rear surface and an outlet opening defined proximate the nozzle tip;

a water passage extending from the inlet opening to the outlet opening of each inner nozzle protrusion, wherein the plurality of inner nozzle protrusions are supported within the plurality of outer nozzles;

a waterway extending within the shell between an inlet and an outlet;

a backer support operably coupled to the shell, the waterway cooperating with the backer support to provide a clamping force against the membrane;

wherein the backer support and the membrane define a chamber for water flow from the outlet of the waterway through the inner nozzle protrusions; and wherein the nozzle openings include planar edges to cooperate with planar surfaces on the outer nozzles and prevent relative rotation of the outer nozzles.

11. A showerhead comprising:

a faceplate including a faceplate front surface, a faceplate rear surface, and a plurality of nozzle openings extending from the faceplate front surface to the faceplate rear surface;

a shell coupled to the faceplate;

a plurality of outer nozzles supported within the nozzle openings of the faceplate, the plurality of outer nozzles extending outwardly relative to the faceplate front surface from an inlet to an outlet;

a membrane including:

a membrane front surface and a membrane rear surface, a plurality of inner nozzle protrusions extending outwardly from the membrane front surface, and each inner nozzle protrusion having a nozzle tip, and each inner nozzle protrusion including an inlet opening defined proximate the membrane rear surface and an outlet opening defined proximate the nozzle tip;

a water passage extending from the inlet opening to the outlet opening of each inner nozzle protrusion, wherein the plurality of inner nozzle protrusions are supported within the plurality of outer nozzles;

a waterway extending within the shell between an inlet and an outlet;

a backer support operably coupled to the shell, the waterway cooperating with the backer support to provide a clamping force against the membrane;

wherein the backer support and the membrane define a chamber for water flow from the outlet of the waterway through the inner nozzle protrusions; and wherein the waterway includes an upper member and a lower member supported for axial adjustment relative to the upper member.

12. The showerhead of claim 11, wherein the upper member of the waterway is threadably coupled to the lower member of the waterway.

13. A showerhead comprising:

a faceplate including a faceplate front surface, a faceplate rear surface, and a plurality of nozzle openings extending from the faceplate front surface to the faceplate rear surface;

a shell coupled to the faceplate;

a plurality of outer nozzles formed of a rigid material and supported within the nozzle openings of the faceplate, the plurality of outer nozzles extending outwardly from the faceplate front surface from an inlet to an outlet;

a membrane formed of a flexible material and including:

a membrane front surface and a membrane rear surface, a plurality of inner nozzle protrusions extending outwardly from the membrane front surface, and each inner nozzle protrusion having a nozzle tip, each inner nozzle protrusion including an inlet opening defined proximate the membrane rear surface and an outlet opening defined proximate the nozzle tip, and a water passage extending from the inlet opening to the outlet opening of each inner nozzle protrusion, wherein the plurality of inner nozzle protrusions are supported within the plurality of outer nozzles, and the nozzle tips protrude outwardly beyond the outlet of the outer nozzles;

a backer support including:

a plurality of standoffs, and a plurality of water passageways defined between the standoffs, the water passageways in fluid communication with the water passages of the inner nozzle protrusions;

wherein the plurality of standoffs secure the membrane between the outer nozzles and the backer support;

a waterway extending within the shell between an inlet and an outlet, the waterway cooperating with the backer support to provide a clamping force against the membrane; and wherein the backer support and the membrane define a chamber for water flow from the outlet of the waterway through the inner nozzle protrusions.

14. The showerhead of claim 13, wherein the waterway includes an upper member and a lower member supported for axial adjustment relative to the upper member.

15. The showerhead of claim 14, wherein the upper member of the waterway is threadably coupled to the lower member of the waterway.

16. The showerhead of claim 13, wherein the outer nozzles are formed of a rigid metal, and the membrane is formed of a flexible elastomer.

17. The showerhead of claim 13, wherein the standoffs are oriented circumferentially around the opening on each inner nozzle protrusion thereby defining radial flow paths to the openings of the inner nozzle protrusions.

18. The showerhead of claim 13, wherein the nozzle openings include planar edges to cooperate with planar surfaces on the outer nozzles and prevent relative rotation of the outer nozzles.

* * * * *